United States Patent [19]

Neumann

[11] Patent Number: 4,831,301
[45] Date of Patent: May 16, 1989

[54] DYNAMO-ELECTRIC MACHINE LAMINATION CONSTRUCTION

[75] Inventor: Thomas W. Neumann, Fort Wayne, Ind.

[73] Assignee: General Electric Company, Fort Wayne, Ind.

[21] Appl. No.: 198,147

[22] Filed: May 24, 1988

Related U.S. Application Data

[63] Continuation-in-part of Ser. No. 116,303, Nov. 4, 1987.

[51] Int. Cl.⁴ .............................................. H02K 1/00
[52] U.S. Cl. ................................... 310/216; 310/184; 310/254; 310/261
[58] Field of Search ................... 310/42, 45, 216, 217, 310/179, 180, 184, 214, 215, 261, 264, 267, 254, 258, 259; 336/216

[56] References Cited

U.S. PATENT DOCUMENTS

| | | | |
|---|---|---|---|
| 2,528,154 | 10/1950 | Ludwig | 310/211 |
| 2,794,138 | 5/1957 | Dunn, Jr. | 310/261 |
| 3,122,667 | 2/1964 | Baciu | 310/45 |
| 3,401,280 | 9/1968 | Lackey | 310/42 |
| 4,209,720 | 6/1980 | Ducrot | 310/45 |
| 4,566,179 | 1/1986 | Sawyer | 310/216 |

OTHER PUBLICATIONS

Part 4; "Dimensions, Tolerances, and Mounting", pp. 1, 5, 6; MG 1-1987; ANSI/NEMA Standards.
Part II; "Dimensions–AC and DC Small and Medium Machines", pp. 1, 2; MG 1-1987.

Primary Examiner—R. Skudy
Attorney, Agent, or Firm—Ralph E. Krisher, Jr.

[57] ABSTRACT

A dynamo-electric machine including a stator core fixed in a casing and formed of stator lamination plates, and a rotor supported in a bore of the stator core and formed of a stack of rotor lamination plates. Each stator lamination plate has a tooth portion extending radially outward from the bore to an intermediate circumference, and yoke portion defined between the intermediate circumference and the outer periphery of the stator lamination plate. Each of the rotor lamination plates has a number of equally circumferentially spaced closed slots, wherein each slot is in the form of a double squirrel cage arrangement. In an embodiment, the teeth of the stator lamination plates are sufficiently wide relatively to the area of stator slot openings so that the ratio of flux density in the tooth portion to flux density in the yoke portion is optimized for a given n-pole operating configuration of the stator winding. The rotor winding matches the stator winding to provide the proper interaction with the stator winding and likewise to provide a high ratio of lamination material as compared to the winding material.

20 Claims, 4 Drawing Sheets

| ANSI NEMA FRAME SIZE | POLES | LAMINATION O.D. IN MM STATOR | LAMINATION O.D. IN MM ROTOR | PUNCHED I.D. IN MM STATOR | PUNCHED I.D. IN MM ROTOR | STATOR TOOTH WIDTH T1 | STATOR SLOT WIDTH W10 | ID/OD SPECIFIC SIZE | ID/OD RANGE | T1/TS SPECIFIC SIZE | T1/TS RANGE | FLUX DENSITY RATIO TOOTH YOKE PORTIONS BT1/BY1 SPECIFIC VALUE | FLUX DENSITY RATIO RANGE | S2×T2/S1×T1 SPECIFIC VALUE * | RANGE * |
|---|---|---|---|---|---|---|---|---|---|---|---|---|---|---|---|
| 250 | 4 | 292 | 175 | 175 | 54.036 | 9.25 | 3.2 | 0.599 | .58-.62 | 0.606 | .59-.63 | 1.25 | 1.20-1.30 | .880 | .84-.94 "LOW COST" |
| 250 | 4 | 292 | 175 | 175 | 54.036 | 8.75 | 3.2 | 0.599 | .58-.62 | 0.573 | .53-.60 | 1.10 | 1.05-1.15 | .875 | .82-.92 "HIGH EFFICIENCY" |
| 280 | 4 | 323 | 190 | 190 | 59.88 | 10.4 | 3.2 | 0.588 | .57-.61 | 0.627 | .60-.65 | 1.29 | 1.25-1.35 | .875 | .85-.91 "LOW COST" |
| 280 | 4 | 323 | 190 | 190 | 59.88 | 9.25 | 3.2 | 0.588 | .57-.61 | 0.558 | .53-.60 | 1.225 | 1.15-1.25 | .850 | .82-.90 "HIGH EFFICIENCY" |

* S2 (NUMBER OF ROTOR SLOTS)
S1 (NUMBER OF STATOR SLOTS)
T1 (STATOR TOOTH WIDTH)
T2 (ROTOR TOOTH WIDTH)

DYNAMO-ELECTRIC MACHINE LAMINATION CONSTRUCTION

CROSS REFERENCE TO RELATED APPLICATION

This application is a continuation-in-part-of my co-pending application Ser. No. 116,303 filed Nov. 4, 1987 (03-GP-6134).

BACKGROUND OF THE INVENTION

1. FIELD OF THE INVENTION

The present invention relates generally to core laminations or punchings for use in dynamo-electric machines, and more particularly to a lamination construction in which teeth and yoke portions of the laminations have relative dimensions such as to provide improved output for a given size machine.

2. DESCRIPTION OF THE KNOWN ART

Arrangements are known for improving the efficiency or power output of dynamo-electric machines through the provision of certain slot distributions in either a stator or rotor core element of the machine, e.g. U.S. Pat. No. 4,566,179 (Jan. 28, 1986), or by creating a prescribed variation of magnetic flux through a pole of the machine stator relative to the ampere-turns of the pole such as in U.S. Pat. No. 4,209,720 (June 24, 1980). There has not, however, been disclosed a machine lamination construction by which the operating efficiency of a dynamo-electric machine having a stacked laminator stator and/or rotor is improved by a prescribed ratio of inner diameter to outer diameter for the lamination. Also, there has been no disclosure of a lamination construction by which the ratio of flux density in a tooth portion of the lamination to flux density in a yoke portion of the lamination, can be increased over that obtained conventionally and, as a result, yield greater output or operating efficiency for the machine. The laminations are often referred to as castings.

Rotors formed of a stack of laminations having closed slots equally spaced from one another about the periphery of each laminations are known from, for example, U.S. Pat. Nos. 2,794,138 (May 28, 1957) and 3,401,280 (Sept. 10, 1968) both having been assigned to the assignee of the present invention.

Such rotors are primarily used in inductive AC motors, wherein conducting members which extend axially along the rotor through aligned slots of the stacked laminations interact with a rotating magnetic field created in an air gap between the outer circumference of the rotor and the inner circumference of the machine stator. Windings embedded in stator slots between radially inwardly projecting teeth of the stator, adjacent the air gap, are connected to the AC mains and the stator winding conductors pass through a certain order of the stator slots so s to cause magnetic flux in the air gap to rotate in synchromism with the frequency of the AC mains.

Coventionally, each of the rotor slots is constricted between its top and bottom parts in the radial direction to form a so-called neck portion of the slot. Such closed slot rotors ordinarily have the slots in each of the rotor laminations formed with an inverted V-shaped edge at the upper boundary of the top part of the slot, with the center of the V creating a narrow bridge part between the upper boundary of the slot and the outer circumference of the lamination. However, it is also significant to make the size of the slots relative to the rest of the rotor material of a prescribed ratio of flux density to likewise result in a greater yield output or operating efficiency. It is also significant to coordinate the size of the slots in the rotor with the teeth of the stator in order to combine the result so as to provide the greater efficiency with reduced cost.

SUMMARY OF THE INVENTION

An object of the invention is to provide a dynamo-electric machine construction in which operating improvement is obtained by use of a greater amount of lamination material, and with less winding conductors than used previously.

Another object of the invention is to provide a dynamo-electric machine in which leakage flux from end turns of a winding embedded in slots of a laminated core, is substantially reduced.

A further object of the invention is to provide a dynamo-electric machine having a greater horsepower to volume ratio than that previously obtained.

A further object of the invention is to provide a dynamo-electric machine having stator laminations in which the ratio of the flux density in the tooth portion of the lamination to the flux density in the yoke portion of the lamination is optimized.

Still a further object of the present invention is to provide a dynamo-electric machine having rotor laminations wherein the rotor slots are optimized to coordinate with the stator lamination being utilized.

According to the invention, a dynamo-electric machine is provided which includes a generally cylindrical casing and a stator core fixed in the casing and comprised of stator laminations. The stator winding is embedded in slots extending from the bore of the stator core and a rotor is supported in the bore. The rotor is likewise formed of rotor laminations and includes conductors for interacting with a magnetic field produced in an air gap between the outer periphery of the rotor and the inner periphery of the stator core.

Each of the stator laminations is comprised of a flat annular of ferromagnetic material with a pre-selected outer diameter and a generally circular inner opening of a pre-selected inner diameter. The stator laminations have a number of equally circumferentially spaced slots extending radially outwardly from the bore to an intermediate circumference of the lamination to establish teeth between the slots. A tooth portion is defined by the teeth between the intermediate circumference and the bore, and a yoke portion is defined between the intermediate circumference and the outer periphery of the stator lamination plate.

Each of the rotor laminations is comprised of a flat circular plate of ferromagnetic material with a number of equally circumferentially spaced closed slots extending radially near the outer periphery of the plate. Each of the slots is in the form of a double cage arrangement having a substantially triangular V-shaped upper edge and continuing through a narrow neck portion down to an elongated V-shaped lower cage. The particular size of the slots are formulated to coordinate with the particular stator size being utilized in order to optimize the dynamo-electric machine.

For a given ratio of the pre-selected inner diameter to the pre-selected outer diameter for the annular stator lamination, the stator teeth are sufficiently wide relative to the area of the stator slot openings so that the ratio of flux density in the tooth portion to flux density in the yoke portion is optimized for a given n-pole operating configuration to the stator winding. The particular rotor lamination is likewise matched for optimizing the ratio of flux density in the rotor lamination and for matching the particular rotor to the stator being utilized.

In the foregoing parent co-peding application Ser. No. 116,303, there was described specific embodiments of stator and rotor laminations useful for a type of motor generally of a 180 frame size and a 210 frame size. The present application optimizes the particular structure of the stator and rotor lamination for a 250 frame size and 280 frame size, both having 4 poles.

The various features of novelty which characterize the invention are pointed out with particularity in the claims annexed to and forming a part of the present disclosure. For a better understanding of the invention, its operating advantages and specific objects attained by its use, reference should be had to the accompanying drawing and descriptive matter in which there are illustrated and described preferred embodiments of the invention.

DETAILED DESCRIPTION OF THE INVENTION

Figure 1:
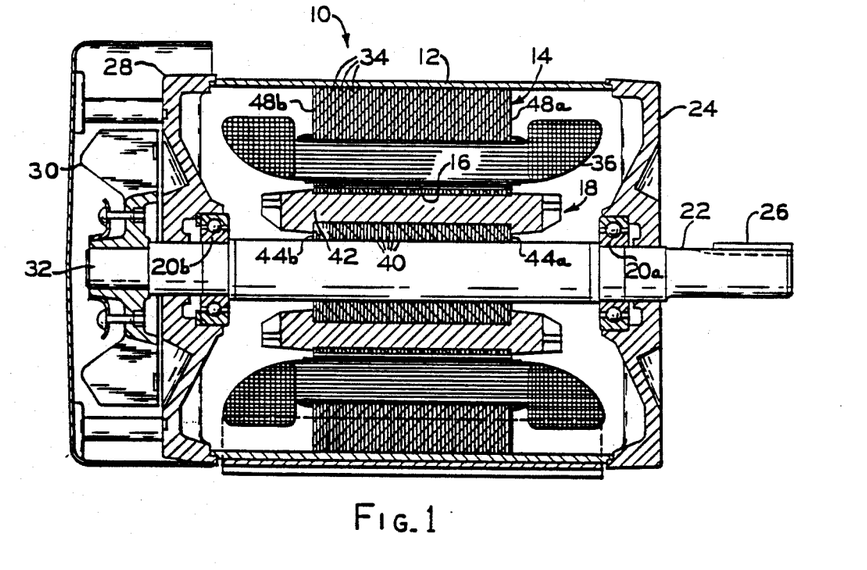
FIG. 1 is a side view, partly in section, of a dynamo-electric machine in which the present invention may be embodied.
Figure 2:
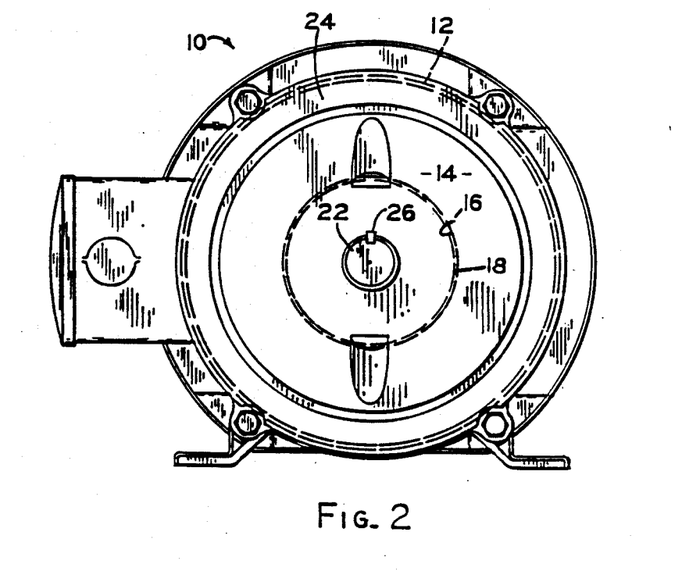
FIG. 2 is a front view of the machine in FIG. 1.

FIG. 1 shows a side view, in section, of a dynamo-electric machine 10 in which the present invention may be embodied. A front view of the machine 10 is shown in FIG. 2.

Basically, the machine 10 includes a generally cylindrical outer casing 12, and a generally cylindrical stator 14 fixed coaxially within the outer casing 12 and having a coaxial stator bore 16. A rotor 18 is supported by suitable bearings 20a, 20b at the front and back of the casing 12, to extend axially within the stator bore 16 and for rotational movement about the bore axis. In the particular example shown, a shaft part 22 of the rotor 18 extends axially from a front end shield 24 of the machine 10, and has a key 26 projecting radially outward from a recess cut axially a certain distance from the front of the shaft part 22. Key 26 serves to lock the shaft part 22 into a corresponding key way cut in a load member (not shown), e.g., a fan, to which rotational motive power is to be supplied by the machine 10.

A back end shield 28 (FIG. 1) together with the casing 12 and the front end shield 24 serve to contain and protect the stator 14, rotor 18 and associated conductive windings. In the example shown, a machine cooling fan 30 is mounted on a rotor stub part 32 which extends outside the back end shield 28, and directs an air current flow over the casing.

As shown in FIG. 1, the stator 14 is comprised of a stack of stator laminations 34 of ferromagnetic material. The stator laminations 34 are stacked face-to-face and are held together to form a core by any of various means well known in the art. A number of slots extend along the axial length of the stator 14 (see FIG. 3) and extend radially from the stator bore 16. These slots accommodate stator windings that have end turns 36, parts of which are shown in FIG. 1. Details of individual laminations embodying the invention in preferred forms are given below.

As shown in FIG. 1, the shaft part 22 of the rotor 18 extends axially through the machine casing or housing 12 and has a stack of rotor laminations 40 fixed coaxially on the shaft part 22 intermediate the front and back bearings 20a, 20b. Sets of conductive bars 42 pass through a number of axially extending slots formed in the rotor 18 (see FIG. 6) near the outer periphery of each of the rotor laminations 40. The bars 42 are shorted to one another at the axial ends 44a, 44b of the rotor laminations 40 by a set of end rings.

In FIG. 1, the stator winding end turns 36 at axial end faces 48a, 48b, of the stator 14, are a potential source of stator flux leakage, i.e., magnetic flux produced by the stator winding which does not interface with the conductive bars 42 in the rotor laminations 40. Inasmuch as stator flux leakage does not contribute to the resultant torque exerted on the rotor 18 when the stator winding or windings are energized, such flux leakage adversely effects the operating efficiency of the machine 10. It will, therefore, be understood that any means by which potential sources of stator flux leakage can be reduced or eliminated, are of great importance in dynamo-electric machine construction.

Certain machine construction standards for frame sizes of dynamo-electric machines are known in the industry, particularly those set out by ANSI/NEMA Standards Publication No. MG1-1987. The entire contents of the cited publication are incorporated by reference herein.

The present invention aims to provide a dynamo-electric machine construction which conforms with industry standards, particularly with respect to the so-called 250 and 280 NEMA frame size constructions. It will be understood, however, that although dimensions for machine laminations disclosed herein will apply to the 250 and 280 frame sizes, the invention can be embodied with advantage in machines of various sizes and proportions.

Figure 3:
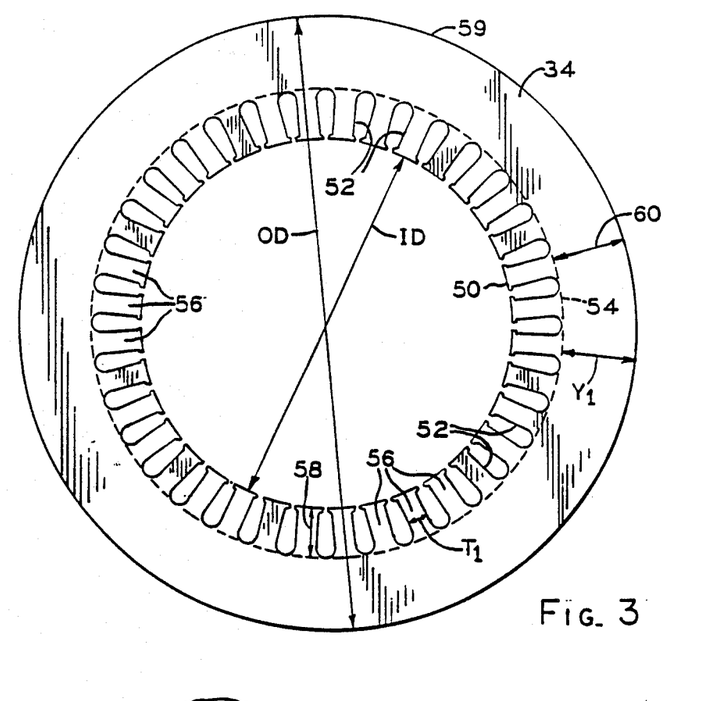
FIG. 3 is a plan view of a lamination for forming a stator in the machine of FIGS. 1 and 2.
Figure 5:
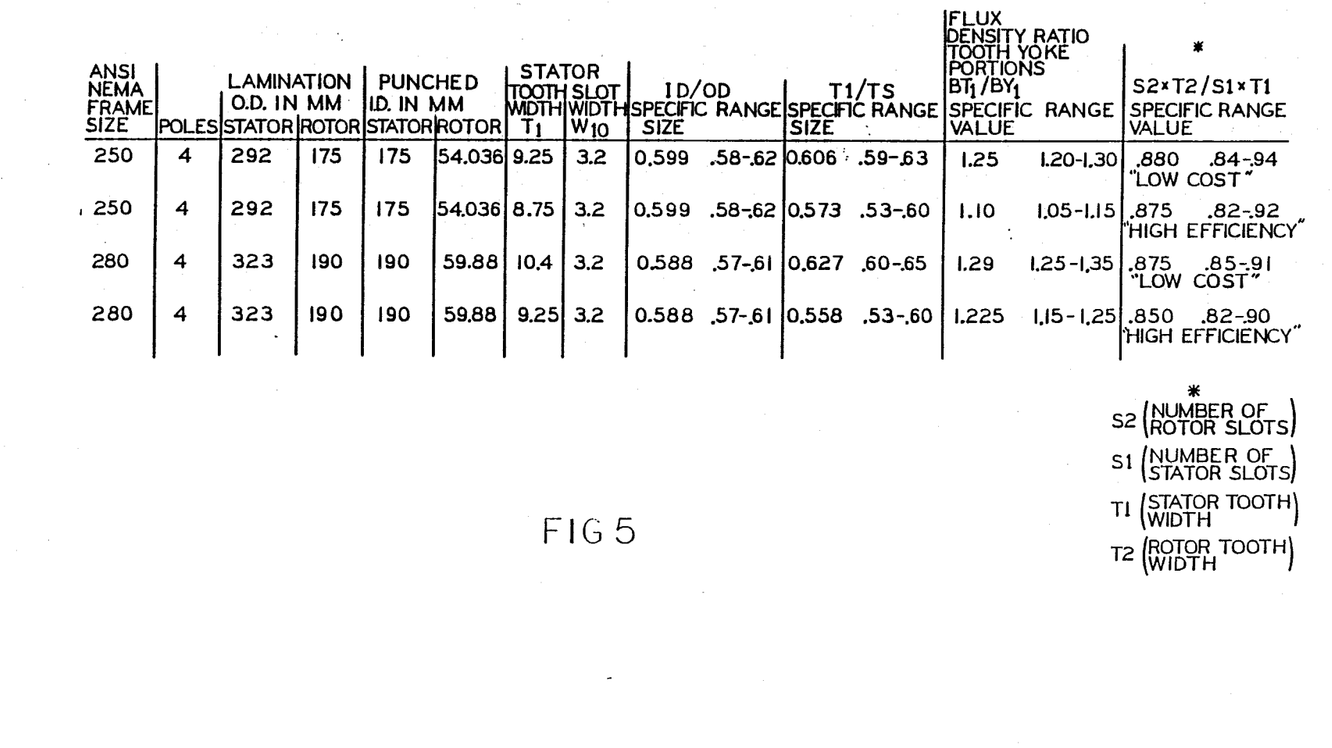
FIG. 5 is a table showing preferred ranges and specific values of physical relationships and ratios associated with the lamination of FIG. 3 when dimensioned for NEMA 250 and NEMA 280 frame sizes.

In FIG. 3, the stator lamination 34 according to the invention comprises a flat annular plate of ferro-magnetic material having an outer diameter "OD" according to the tabular values of FIG. 5 and a generally circular bore opening 50 of a certain inner diameter "ID". The stator lamination 34 has a number of equally circumferentially spaced slot openings 52 extending radially from an intermediate circumference 54 to form a number of teeth 56 which extend radially to the circumference of the bore opening 50. For both the 250 and 280 NEMA frame sizes of the present embodiments the number of slots is. The bore has a diameter of "ID". In the illustrated embodiments in FIG. 3, lamination 34 is the stator lamination so that the circumference of the bore opening 50 defines one boundary for a stator-rotor air gap and a bore for receiving the rotor.

The slot openings 52 are formed to contain one or more stator windings which extend axially through the stator 14 when like ones of the stator laminations 34 are stacked face to face with corresponding slot openings 52 substantially aligned with one another. In the assembled machine 10 of FIGS. 1 and 2, the stator windings are arranged to correspond to an n (e.g., n=2, 4 or 6) pole operating configuration for the machine 10. When the stator windings are connected to an outside electrical source, magnetic flux is produced next to the substantially aligned air gap peripheries of the stacked stator laminations 34 to interact with the conductive bars 42 of the rotor 18.

The annular stator lamination 34 in FIG. 3 includes a tooth portion 58 defined by the teeth 56 between the intermediate circumference 54 and the air gap periphery. The remainder of the stator lamination 34 is continuous between the intermediate circumference 54 and the outer periphery 59 to define a yoke portion 60 of the stator lamination 34. The stator tooth width is designated in FIG. 3 at $T_1$, and $Y_1$ is a dimension of yoke portion 60 in the radial direction.

Figure 4:
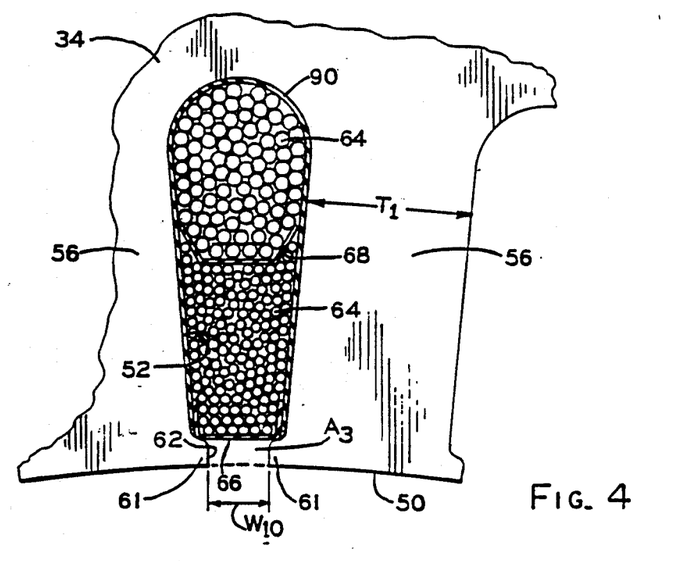
FIG. 4 is an enlarged view of a part of the lamination in FIG. 3 and showing a stator slot.

FIG. 4 is an enlarged view of a part of the stator laminations 34 in FIG. 3. Specifically, a single slot opening 52 is shown surrounded by adjacent teeth 56. Lip parts 61 project circumferentially toward one another from the adjacent teeth 56, to define a mouth 62 of width $W_{10}$ of the slot opening 52. As is known, mouth 62 should be sufficiently wide to allow individual conductors 64 forming the stator winding to be inserted in the opening 52 through the mouth 62 when the machine 10 is assembled. The lip parts 61 act to seat a winding closure wedge 66 which holds the conductors 64 of the stator winding firmly in place within the stator slots formed by the openings 52. To separate individual stator windings, an insulating winding separator 68 may be positioned as shown in FIG. 4 in the stator slots, and an insulating film 90 positioned against the walls of the stator slots prevents arcing or short circuiting of individual conductors 64 with the material of which the laminations laminations 34 are made.

According to one aspect of the invention, for a given ratio of inner diameter ID to outer diameter OD of the stator taminations 34, the teeth 56 are sufficiently wide relative to the area of the slot openings 52 so that the ratio of flux density in the tooth portion 58 to flux density in the yoke portion 60 when the stator windings are energized, with electric current, is substantially optimized for a given n pole operation of the stator windings. The actual number of slot openings is not critical. For example, the stator lamination 34 in FIG. 3 is shown with 36 slots and has relative dimensions suitable for incorporation in a NEMA 250 or a NEMA 280 frame size machine.

An underlying concept of the present invention is to utilize maximum amounts of ferromagnetic material (e.g., iron) for the stator laminations 34 and minimum amounts of winding conductors, e.g., the individual conductors 64 in a dynamo-electric machine having a desired power handling capability.

In the disclosed embodiments, the ratios of the tooth portions 58 to yoke portions 60 for the stator laminations 34 substantially differ from the known constructions, as does the ratio of inner diameter to outer diameter of the stator laminations 34. The lip parts 61 thus become very small relative to the known structure as a consequence of the relatively wide teeth 56. Use of less winding material also results in smaller end turns (e.g., the stator end turns 36) at the end faces of the lamination stack and, thus, undesired flux leakage is significantly reduced from that in the prior constructions.

Figure 6:
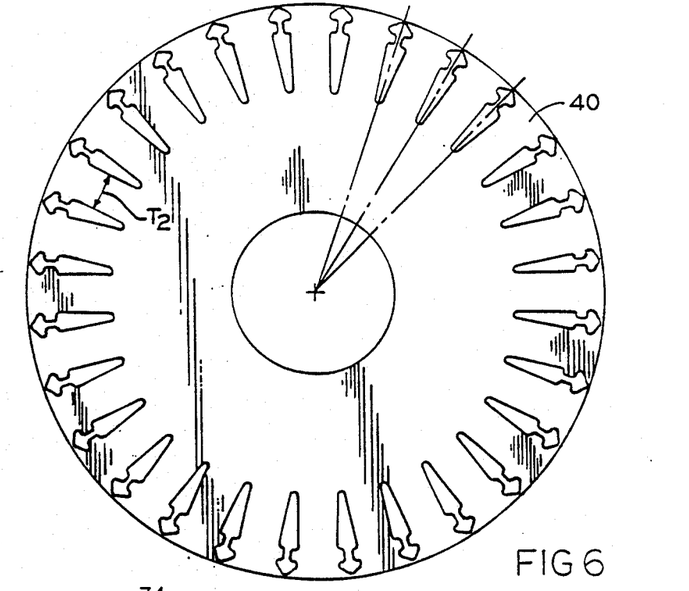
FIG. 6 is a plan view of a lamination for forming a slotted rotor compatible with the stator lamination of FIG. 3.

FIG. 6 illustrates rotor lamination 40 compatible for use with the stator lamination of FIG. 3. FIG. 6 indicates the wide $T_2$ of the rotor teeth and it will be understood that a rotor fabricated as shown in FIG. 6 would include a number of rotor slots, and the same number of rotor teeth each having a width $T_2$. In the present embodiments for the 250 and 280 frame sizes, the number of rotor slots is equal to 28. The same concept of increasing the amount of ferromagnetic material as compared to the amount of copper, or conductive material, is thus also applied to a rotor lamination, by making the teeth wider on the machine rotor and the rotor slots smaller than in the known rotor constructions.

Figure 7:
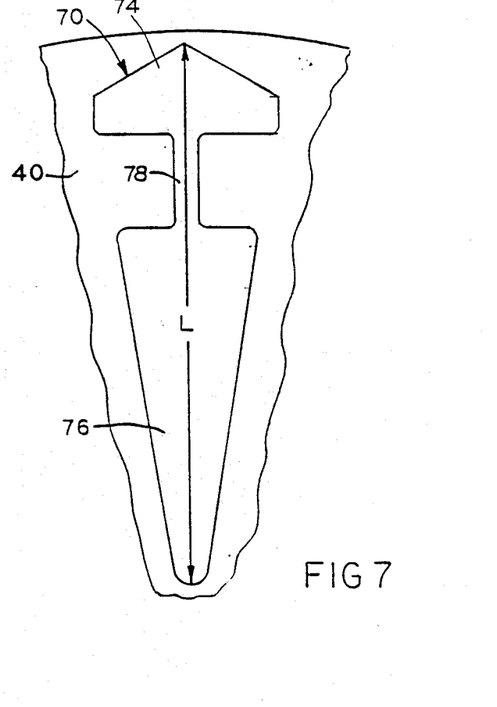
FIG. 7 is an enlarged view of a part of the lamination in FIG. 6 and showing a rotor slot.

Referring to FIG. 7, there is shown one of rotor the slots 70 contained on rotor lamination 40. The rotor slot 70 is seen to include an upper cage 74 and a lower cage 76 interconnected by a neck portion 78. The overall length of the slot is given by the value L. The overall area of the rotor slot is indicated by the value A in Table I below. For NEMA 250 and 280 frame sizes, Table 1 below lists the length and area for four rotor laminations. Each frame size has two embodiments, one referred to as the "low cost" and the other referred to as the "high efficiency" embodiment.

TABLE I

| | ROTOR SLOTS | | |
|---|---|---|---|
| | L (mm) | A (mm$^2$) | |
| 250 | 33.762 | 139.940 | "Low cost" |
| 250 | 36.538 | 162.114 | "High efficiency" |
| 280 | 35.819 | 157.075 | "Low cost" |
| 280 | 42.924 | 220.717 | "High efficiency" |

The following Table II also illustrated in FIG. 5 shows preferred ranges and specific values for physical constants, relationships, and ratios associated with both stator and rotor laminations.

TABLE II

| ANSI NEMA FRAME SIZE | POLES | LAMINATION O.D. IN MM STATOR | LAMINATION O.D. IN MM ROTOR | PUNCHED I.D. IN MM STATOR | PUNCHED I.D. IN MM ROTOR | STATOR TOOTH WIDTH $T_1$ | STATOR SLOT WIDTH $W_{10}$ | ID/OD SPECIFIC SIZE | ID/OD RANGE | T1/TS SPECIFIC SIZE | T1/TS RANGE |
|---|---|---|---|---|---|---|---|---|---|---|---|
| 250 | 4 | 292 | 175 | 175 | 54.036 | 9.25 | 3.2 | 0.599 | .58–.62 | 0.606 | .59–.63 |
| 250 | 4 | 292 | 175 | 175 | 54.036 | 8.75 | 3.2 | 0.599 | .58–.62 | 0.573 | .53–.60 |
| 280 | 4 | 323 | 190 | 190 | 59.88 | 10.4 | 3.2 | 0.588 | .57–.61 | 0.627 | .60–.65 |
| 280 | 4 | 323 | 190 | 190 | 59.88 | 9.25 | 3.2 | 0.588 | .57–.61 | 0.558 | .53–.60 |

| ANSI NEMA FRAME SIZE | FLUX DENSITY RATIO TOOTH YOKE PORTIONS $BT_1/BY_1$ SPECIFIC VALUE | RANGE | S2XT2/S1XT1 SPECIFIC VALUE | RANGE |
|---|---|---|---|---|
| | | | | |

TABLE II-continued

| | | | | |
|---|---|---|---|---|
| 250 | 1.25 | 1.20–1.30 | .880 | .84–.94 |
| | | | "LOW COST" | |
| 250 | 1.10 | 1.05–1.15 | .875 | .82–.92 |
| | | | "HIGH EFFICIENCY" | |
| 280 | 1.29 | 1.25–1.35 | .875 | .85–.91 |
| | | | "LOW COST" | |
| 280 | 1.225 | 1.15–1.25 | .850 | .82–.90 |
| | | | "HIGH EFFICIENCY" | | wherein S2 is the number of rotor slots; S1 is the number of stator slots; T1 is a stator tooth width; T2 is a rotor tooth width; $BT_1$ is a flux density of the tooth portion 58 (FIG. 3) and $BY_1$ is a flux density of the yoke portion (FIG. 3) when the stator windings are energized.

Table II shows preferred ranges and relationships for stator and rotor laminations having a certain number of slots $S_1=36$ and $S_2=28$ and dimensions for the NEMA 250 and NEMA 280 frame sizes. The NEMA Standards limit the maximum outside dimensions of the motor in which the stator lamination construction is to be optimized. Outer diameters (O.D.) and inner diameters for both stator and rotor laminations for use in the 250 and 280 frame sizes are represented in Table II and FIG. 5. Table II and FIG. 5 provides both show specific values as well as ranges for various ratios which are used to define the improved laminations. The ratios ID/OD represents the ratio of the inner diameter of the stator lamination to the outer diameter, and gives an indication of the increased amount of ferromagnetic material over copper which is used in the present laminations. The ratio T1/Ts represents a ratio of the tooth wide ($T_1$) of the stator lamination with respect to the bore circumference divided by the number of slots $S_1$, ($TS = \pi \times ID/S_1$). This effectively provides an indication of the tooth width. The value $BT_1/BY_1$ can be used to represent the ratio of the flux density in the tooth to the flux density in the yoke if it is assumed that the flux through the tooth and yoke is the same, which is a close approximation. This ratio is also determinable geometrically from a stator lamination by the relationship $BT_1/BY_1 = (\pi \times n \times Y1)/(S1 \times T1)$ where n is the number of poles, Y1 is the dimension shown in FIG. 3 and $S_1$ and $T_1$ are as defined hereinabove.

The final column in Table II and also FIG. 5 is a ratio of the interaction of the stator to the rotor, where S represents the number of slots, T represents the width of the tooth, 1 represents the stator and 2 represents the rotor. THE TABLE II sets forth values and ranges for a 4-pole machine (n=4). For each of the 250 and 280 frame sizes, the two embodiments are shown, namely, the "low cost" configuration and the "high efficiency" configuration. As can be seen from Table II, the ratio of the inner diameter to the outer diameter for the stator lamination may be in the range of from about 0.57 to 0.62, and the ratio of flux density is in the range of about 1.05 to 1.35. The ratio of the inner diameter to the outer diameter may be about 0.599 and the ratio of flux density may be from about 1.20 to 1.30. The ratio of the inner diameter to the outer diameter may be about 0.599 while the ratio of flux density in this case may be from 1.05 to about 1.15. The outer diameter of the stator lamination may be about 292 mm.

The ratio of the inner diameter to the outer diameter may be about 0.588 and the ratio of flux density may be from about 1.25 to 1.35 for given stator laminations. In an embodiment, the ratio of the inner diameter to the outer diameter may be about 0.588 and the ratio of flux density may be from about 1.15 to 1.25. The stator lamination may have the outer diameter about 323 mm. If the product of the number of rotor slots times the rotor tooth width is a first value and the product of the number of stator slots times the width of the stator teeth is a second value, the ratio of the first value to the second value may be in the range of 0.82 to 0.94.

The length L of the slot openings may be in the range between 33 mm. and 43 mm. and the area of the slot openings may be in the range from 139 mm$^2$ to 221 mm$^2$.

In addition to having a lower inner diameter to outer diameter ratio, and a higher ratio of flux density between the tooth and yoke portions than in prior corresponding laminations, the teeth width of the present laminations is generally greater. It should be remembered that the present improved laminations are the result of an interaction of the various values. Thus, not each and every one of the values is consistently changed for each embodiment. The result, however, is consonant with the underlying concept of the present invention which, as mentioned, is to utilize maximum amounts of lamination material and minimum amounts of winding (i.e., copper) material.

Machines employing laminations configured according to the invention have yielded greater horsepower to volume ratios when compared with known corresponding machines. Of course, variations may occur depending on efficiency.

Through the use of relatively wider teeth in the present laminations, flux density saturation for a given size and power machine can be achieved with a shorter lamination stack than in the prior constructions. Hence, the electromagnetic volume (OD)$^2$L for machines according to the invention is generally lower than the volumes in the prior machines for the same efficiency. The use of wider or fatter teeth also produces a relatively higher flux density in the air gap between stator and rotor lamination stacks in machines according to the invention. Thus, more torque is produced on the rotor for a given machine size.

While the foregoing description represents preferred embodiments of the present invention, it will be obvious to those skilled in the art that various changes and modifications may be made, without departing from the true spirit and scope of the present invention.

I claim:

1. A stator lamination for use in a generally cylindrical stack in a dynamo-electric machine, comprising:
    a flat annular plate of ferromagnetic material having a given outer diameter and a generally circular bore opening of a certain inner diameter,
    said plate having a number of equally circumferentially spaced slot openings extending radially from an intermediate circumference of said plate to form a number of teeth which extend radially to an air gap periphery of said plate,
    wherein said slot openings are formed to contain electrically conducting elements which extend axially through a stack of laminations when like ones of said plate are stacked face to face with corresponding slot openings substantially aligned with one another, said conducting elements being arranged to correspond to a 4-pole operating configuration, and magnetic flux is produced next to inner peripheries of the stacked plates when electric current is passed through the conducting elements, said annular plate including a tooth portion defined by said teeth between said intermediate circumference and an inner periphery of said annular plate, and a yoke portion defined by a substantially continuous surface of said plate between said intermediate circumference and an outer periphery of said plate radially opposite said inner periphery, wherein for a given ratio of said certain inner diameter to said given outer diameter for said plate, said teeth are sufficiently wide relative to the area of said slot openings so that the ratio of flux density in said tooth portion to flux density in said yoke portion in response to said electric current is optimized for said 4-pole operating configuration; and said ratio of said inner diameter to said outer diameter is in the range of from about 0.57 to 0.62, and said ratio of flux density is in the range of about 1.05 to 1.35.

2. The lamination according to claim 1, wherein said ratio of inner diameter to outer diameter is about 0.599 and said ratio of flux density is from about 1.20 to 1.30.

3. The lamination according to claim 1, wherein said ratio of said inner diameter to said outer diameter is about 0.599 and said ratio of flux density is from 1.05 to about 1.15.

4. The lamination according to claim 2, wherein said bore opening defining said inner periphery, and the outer diameter of said plate is about 292 mm.

5. The lamination according to claim 3, wherein said bore opening defining said inner periphery, and the outer diameter of said plate is about 292 mm.

6. The lamination according to claim 1, wherein the ratio of said inner diameter to said outer diameter is about 0.588 and said ratio of flux density is from about 1.25 to 1.35.

7. The lamination according to claim 1, wherein said ratio of said inner diameter to said outer diameter is about 0.588 and said ratio of flux density is from about 1.15 to 1.25.

8. The lamination according to claim 6, wherein said bore opening defining said inner periphery and the outer diameter of said plate is about 323 mm.

9. The lamination according to claim 7, wherein said bore opening defining said inner periphery and the outer diameter of said plate is about 323 mm.

10. A dynamo-electric machine, comprising:
a generally cylindrical casing;
a stator fixed in said casing and comprised of plate laminations of ferromagnetic material, said stator having a cylindrical bore;
a stator winding embedded in slot openings a certain radial depth from the circumference of said bore and which slot openings extend generally axially along the core, said winding corresponding to a 4-pole operating configuration with end turns of said winding extending beyond end faces of said stator;
a rotor supported by said casing in said bore for rotational movement, said rotor including conductive means for interacting with a magnetic field produced in an air gap extending radially between an outer periphery of said rotor and an inner periphery of the bore of said stator when said stator winding is energized;

wherein each of said stator plate laminations comprises:
a flat annular plate of ferromagnetic material having a preselected outer diameter and a generally circular inner opening of a preselected inner diameter which forms the stator bore when like ones of said plate laminations are stacked face-to-face with one another, said plate having a number of equally circumferentially spaced slots which extend radially outwardly from the bore to an intermediate circumference of said plate and which establish teeth therebetween, the distal ends of said teeth establish said bore, said slot openings forming said stator slots when corresponding slot openings in the like plate laminations are aligned with one another and the plate laminations are stacked, said annular plate including a tooth portion defined by said teeth between said intermediate circumference and said bore, and a yoke portion defined between said intermediate circumference and an outer periphery of said plate, wherein for a given ratio of preselected inner diameter to said preselected outer diameter for said plate, said teeth are sufficiently wide relative to the area of said slot openings so that the ratio of flux density in said tooth portion to flux density in said yoke portion in response to energization of the windings is optimized for said 4-pole operating configuration of said stator winding, and said ratio of inner diameter to outer diameter is in the range from about 5.7 to 0.62, and said ratio of flux density is in the range of from about 1.05 to 1.35.

11. The dynamo-electric machine of claim 10, wherein said ratio of said inner diameter to said outer diameter is about 0.599 and said ratio of flux density is about 1.20 to 1.30.

12. The dynamo-electric machine of claim 10, wherein said ratio of said inner diameter to said outer diameter is about 0.599 and said ratio of flux density is from about 1.05 to 1.15.

13. The dynamo-electric machine of claim 11, wherein the outer diameter of said plate is about 292 mm.

14. The dynamo-electric machine of claim 12, wherein the outer diameter of said plate is about 292 mm.

15. The dynamo-electric machine of claim 10, wherein said ratio of said inner diameter to said outer diameter is about 0.588 and said ratio of flux density is from about 1.25 to 1.35.

16. The dynamo-electric machine of claim 10, wherein said ratio of said inner diameter to said outer diameter is about 0.588 and said ratio of flux density is from about 1.15 to 1.25.

17. The dynamo-electric machine of claim 15, wherein the outer diameter of said plate is about 323 mm.

18. The dynamo-electric machine of claim 16, wherein the outer diameter of said plate is about 323 mm.

19. A dynamo-electric machine comprising a rotor made from laminations having a preselected number of teeth of predetermined tooth widths, and a stator core made of stator laminations wherein the stator is wound for 4-pole operation during energization thereof, and wherein each stator lamination comprises:

a flat annular plate of ferromagnetic material having a given outer diameter and a generally circular bore opening of certain inner diameter, each plate having a number of uniformly circumferentially spaced slot openings extending radially from an intermediate circumference of said plate to form a number of teeth which extend radially to an air gap periphery of said plate, wherein said slot openings are formed to contain electrically conducting elements which extend axially through the lamination stack when like ones of the plates are stacked face-to-face with corresponding slot openings in communication with one another, said conducting elements being arranged to correspond to a 4-pole operating configuration, and magnetic flux is produced around the conducting elements when electric current is passed through the conducting elements, said annular plate including a tooth portion defined by said teeth between said intermediate circumference and an inner periphery of said plate, and a yoke portion defined by a substantially continuous surface of said plate between said intermediate circumference and an outer periphery of said plate radially opposite said inner periphery, and wherein the product of the number of rotor slots times the rotor tooth width is a first value, the product of the number of stator slots times the width of the stator teeth is a second value, and the ratio of the first value to the second value is in the range of 0.82 to 0.94.

20. A dynamo-electric machine as in claim 19, wherein the length of the slot openings are in the range between 33 mm. and 43 mm. and the area of the slot openings range in an area from 139 mm$^2$ to 221 mm$^2$.

* * * * *